Dec. 15, 1925.
B. R. SAUSEN
SPRAY TOWER
Filed Feb. 15, 1923
1,565,593
2 Sheets-Sheet 1
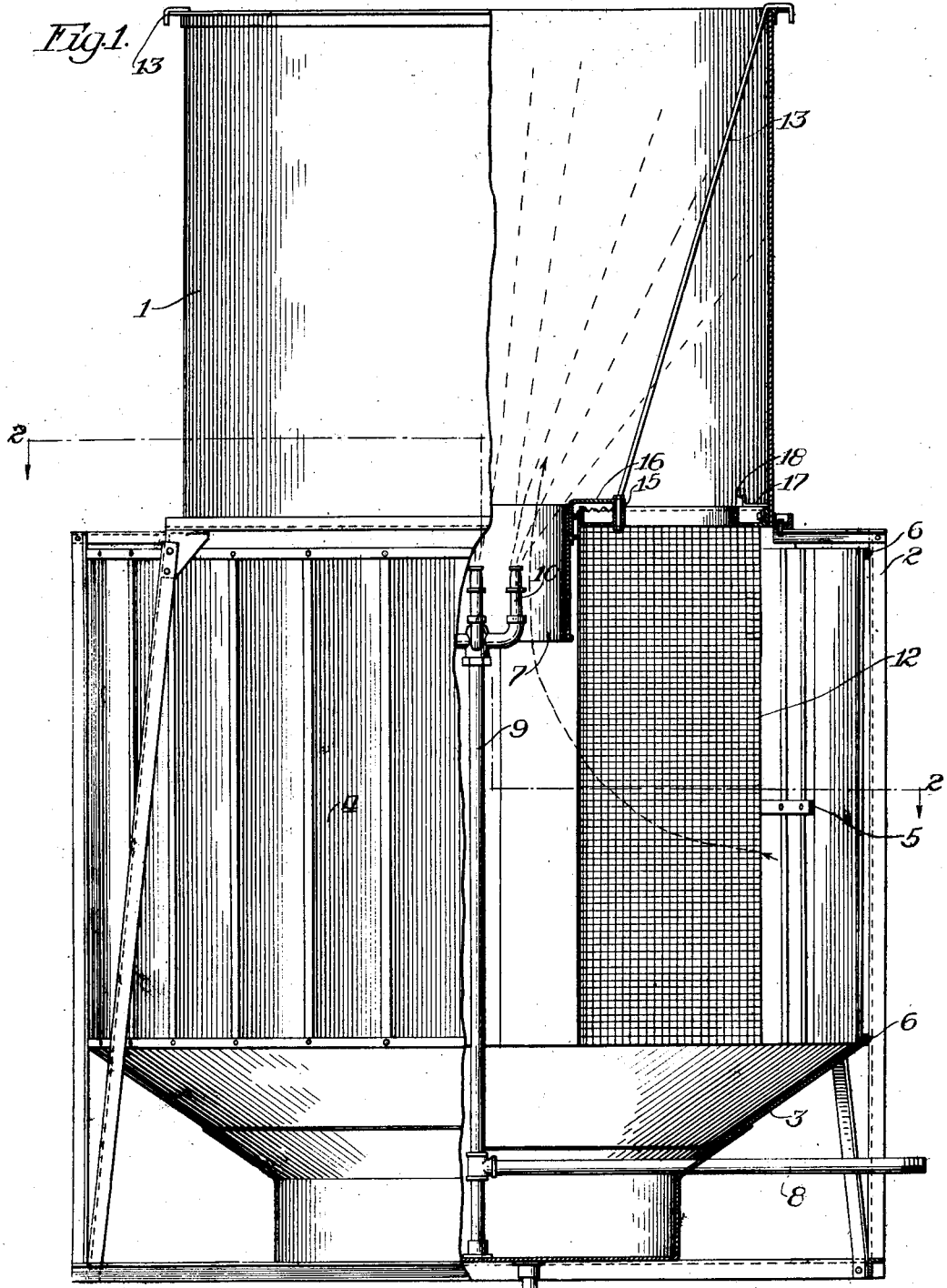

Dec. 15, 1925.
B. R. SAUSEN
SPRAY TOWER
Filed Feb. 15, 1923
1,565,593
2 Sheets-Sheet 2
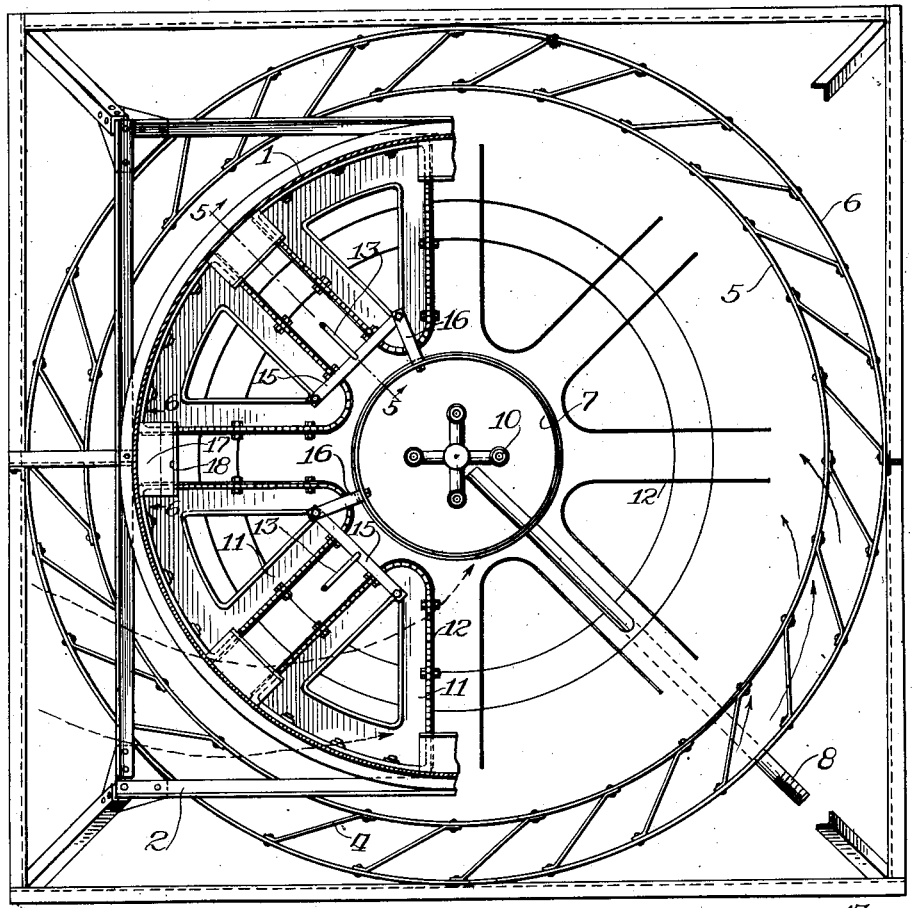
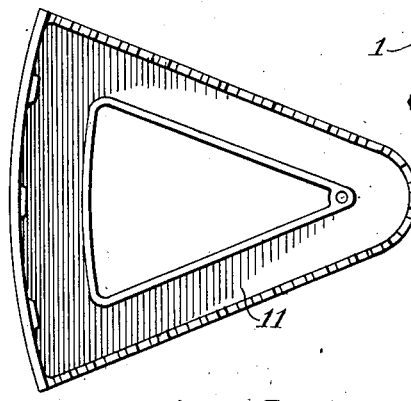
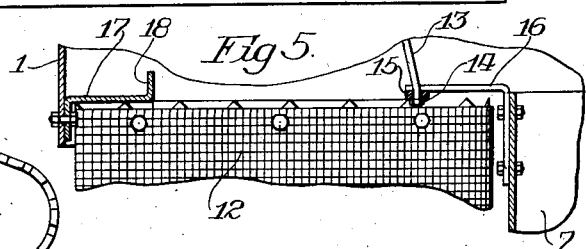
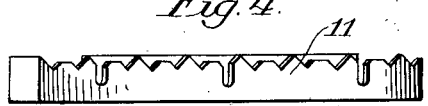
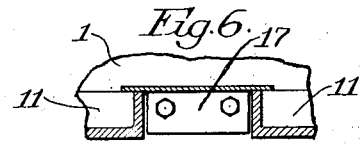
Inventor:
Bert R. Sausen Patented Dec. 15, 1925.

1,565,593

UNITED STATES PATENT OFFICE.

BERT R. SAUSEN, OF OAK PARK, ILLINOIS, ASSIGNOR TO BINKS SPRAY EQUIPMENT CO., A CORPORATION OF ILLINOIS.

SPRAY TOWER.

Application filed February 15, 1923. Serial No. 619,177.

*To all whom it may concern:*

Be it known that I, BERT R. SAUSEN, citizen of the United States, residing at Oak Park, in the county of Cook and State of Illinois, have invented certain new and useful Improvements in a Spray Tower; and I do hereby declare the following to be a full, clear, and exact description of the invention, such as will enable others skilled in the art to which it appertains to make and use the same.

My invention relates to methods and means for effecting an interchange of heat between a liquid and a gas, and in general aims to provide a method and means for this purpose which will be unusually efficient and which will not be materially affected by prevailing wind conditions. In one broad aspect, my invention aims to utilize suction due to the spraying of the liquid for producing movement of the gas past the spray in such a manner as to deflect the spray towards the walls, thereby permitting the liquid from the spray to be caught and redistributed along paths also disposed across the movement of the gas. In another aspect, my invention aims to expose the liquid to the gas twice, namely once in the form of flowing or trickling streams intercepting the flow of the gas towards the spray, and thereafter through the spray itself.

More particularly, my invention aims to provide a method and means whereby the inlets through which air or any other gas is admitted to the heat interchanging appliance cause the admitted gas to rotate substantially about a given axis, whereby suction moves the admitted gas lengthwise of that axis so that the two actions combine in spirally advancing the movement of the gas; whereby the rate of flow of the gas is accelerated by causing it to pass largely through a suction collar, and whereby the required suction for producing the above mentioned effects is obtained by the spraying of the liquid through the mouth of the suction collar. Furthermore, my invention aims to provide an appliance for the above mentioned purpose, in which the spray is moved laterally outward by the gas against the wall of the spray chamber so that the resulting liquid will trickle down that wall; in which the liquid thus trickling down the walls is caught and distributed in a plurality of paths spaced from the wall, and in which perforated members of large area (such as wire screens) define these paths and prolong the time during which the liquid flows across portions of freshly entering gas.

More particularly, my invention provides liquid distributing means arranged in the form of troughs for distributing the liquid, uses such troughs as supports for the screens down which the liquid trickles, aims to dispose these screens effectively with respect to the inlets for the gas, provides simple means for leveling the distributing troughs, and provides simple and desirably cooperating means for supporting both such troughs and the suction-producing collar of the appliance. My invention also provides gas inlets arranged for producing rotation of the admitted gas and for preventing winds from interfering with the action of the appliance. Still further and also more detailed objects will appear from the following specification and from the accompanying drawings, in which—

Fig. 1 is an elevation of a cooling tower embodying my invention, with substantially the right-hand half shown in central and vertical section.

Fig. 2 is a transverse section through the same tower, taken along the zigzag line 2—2 of Fig. 1.

Fig. 3 is an enlarged plan view of one of the troughs which serve as a liquid distributing means, and Fig. 4 is a corresponding elevation of the same, viewed from the bottom of Fig. 3.

Fig. 5 is an enlarged and fragmentary vertical section taken along the line 5—5 of Fig. 2 and showing the method of supporting the troughs, the screens and the suction collar.

Fig. 6 is an enlarged and vertical section taken along the line 6—6 of Fig. 2 and showing one of the bridges or deflectors which prevent liquid from trickling down the wall of the spray chamber between two adjacent troughs.

In its immediate commercial application, my invention is particularly suited for use in connection with the cooling of the condensing water from engines or the like by means of air after the manner of the appliances commonly termed cooling towers. I am therefore illustrating and describing it in connection with an arrangement particularly adapted for that purpose, although I do not wish to be limited to any particular use of my method and means. Cooling towers as heretofore devised for such purposes have generally been rather inefficient and have further been objectionable on account of the interference of winds with their action, particularly when such cooling towers are employed on the roofs of buildings, or in other exposed places. For example, where such cooling towers have been constructed with air inlets consisting of louvres extending horizontally, a wind blowing from one side against the tower is apt to blow the spray out of the tower at the opposite side, thereby wasting considerable liquid and in general reducing the extent of the heat interchanging. So also, if the spray is permitted to descend directly within the tower, as much of it will do by dropping through the spaces between the lattice work commonly disposed within such towers, this descending liquid is not affected to the desired extent by the air moving through the tower. Furthermore, such lattice arrangements interfere considerably with the air movement and hence retard the effectiveness of the appliance as a whole.

To overcome these and other objections, I employ an appliance which desirably consists of two superposed portions, namely an upper spray chamber having an imperforate wall, and a lower air inlet chamber having inlets all around its sides. Thus, Fig. 1 shows a drum or hollow cylinder 1 constituting the spray chamber of the appliance and supported at a considerable distance above a flaring water drip pan 3 by a frame work 2. Interposed between the bottom of the spray chamber 1 and the drip pan 3 are a series of louvres 4 which are here shown as extending between the inner and outer supporting rings 5 and 6 with the faces of the louvres all extending eccentrically of the vertical axis of these rings or substantially tangential of an imaginary cylindrical surface of smaller radius. Owing to this angular disposition of the faces of the louvres, the air entering through the spaces between them flows substantially tangential of the same imaginary cylindrical surface and the air thus entering through a large number of inlets is set in rotation within the air inlet chamber which has its casing formed by these louvres.

Depending within the appliance adjacent to the juncture of the spray chamber with the louvres is a suction collar 7 of a diameter considerably smaller than that of the spray chamber and shown in Fig. 1 as consisting of a simple and substantially cylindrical drum. This suction collar has the spray of liquid projected upwardly through its upper end, or through the outlet of the collar, for which purpose I am here showing the liquid admitted through a supply pipe 8 as supplied through a riser pipe 9 to a group of spray nozzles 10. These spray nozzles are preferably designed for affording a finely divided full mass spray in the form of a solid cone projected close to the upper edge of the suction collar 7, so that the nozzles cooperate in projecting the liquid in a finely atomized and diverging spray into the spray chamber.

Owing to the contraction of the effective upper opening of the suction collar 7 by this spray, a considerable upward draft is produced in this collar by the spray itself, thereby causing a large portion of the air admitted through the louvres to flow upwardly through this collar after the general manner indicated by the arrows in Fig. 1, so that this air will pass upwardly through the finely divided spray and out through the open top of the spray chamber. While the upwardly moving air is thus receiving heat from the spray of warm liquid, the rotation imparted to the air while admitted through the louvres continues after it is drawn through the suction collar, so that the air as a whole advances spirally upward through the spray chamber. In doing so, the centrifugal force due to its rotation causes the air and the spray intermingling with it to move laterally outward or against the imperforate wall 1 of the spray chamber. The finely divided spray is therefore projected against this wall, so that practically all of the spray condenses and trickles down the wall instead of having any considerable portion of it descend directly by gravity.

To catch and distribute the water thus trickling down the wall 1, I provide a series of troughs 11, each of which is desirably in the shape of a hollow sector having side walls extending in the general direction of radii of the spray chamber and having these walls notched (as shown for example in Fig. 4) to cause the water to flow out of the same in finely divided streams. Bolted to each of these troughs is a wire screen 12 which desirably extends in continuous formation along both of the approximately radial outer walls of each trough and which desirably is supported only at its upper end by the corresponding trough. Thus arranged, the screens 12 are disposed in substantially V-shaped or U-shaped formation with their openings directed towards the exterior of the appliance or towards the louvres 4. Consequently, it will be evident from Fig. 2 that the air as admitted through these louvres will largely be intercepted by the screens 12 and will cool the water trickling down these screens, so that this air will be partly cooled before it passes through the suction collar and is intermingled with the spray. By suitably proportioning the parts of my appliance, I can enable the spray to produce such a suction through the collar 7 that the larger part of the air entering through the louvres will pass first through the meshes of one or more screens 12 and then through the suction collar. However, I may provide openings in the centers of each trough after the manner shown in Fig. 3 so that some air may still pass upward into the spray chamber outside of the suction collar.

To make the screens effective for aiding their portion of the heat interchange, it is desirable that the liquid discharged from each trough should flow down with a fair degree of uniformity along the screen supported by that trough. I therefore provide means for leveling each trough, since the appliance as a whole may not be exactly level when erected. For this purpose, I am showing each trough as having its outer edge bolted to the inner face of the spray chamber and as being supported near its inner end by a rod 13 which is hooked over the top of the spray chamber and which can be adjusted in effective length by tightening or loosening a nut 14 underhanging a strap 15 which is bolted to two adjacent troughs after the manner shown in Fig. 2. The straps 15 may also be employed for supporting angle pieces 16 to which the suction collar 7 is bolted after the manner shown in Fig. 1.

To prevent the liquid descending along the inner surface of the spray chamber 1 from partly trickling down between two of the adjacent troughs, I desirably span the laterally outward edge portions of each pair of adjacent troughs by a bridge 17 which has an upwardly directed flange 18 at its inner edge after the manner shown in Figs. 5 and 6.

However, while I have illustrated and described my appliance in a highly desirable construction including certain arrangements for supporting the various parts from one another, I do not wish to be limited to the details of the construction and arrangement thus disclosed, as these might obviously be modified in many ways without departing either from the spirit of my invention or from the appended claims. Neither do I wish to be limited to the employment of my particular spray and suction producing arrangement with the particular louvre arrangement above described, although I have found the combination to be highly effective.

In connection with this louvre arrangement it will readily be seen that the high wind blowing from any side whatever will merely cause the air to enter from that side at an increased velocity and hence will increase the rotation of the air in the lower portion of my appliance. This increased rotational movement will cause air to be drawn in from the leeward side of the appliance instead of blowing parts of either the spray or the more condensed liquid out at the leeward side of the appliance. Moreover, since the wall of the spray chamber proper is imperforate, even a high wind will not blow any of the moisture out of this chamber. It will also be noted that by directing the spray of liquid upwardly I reduce its velocity over that which it would have if the spray were initially directed downwardly, thereby causing the fine mist to be intermingled with the air for a relatively longer period of time and hence increasing the effectiveness of the heat interchanging.

However, I do not wish to be limited to the use of my appliance out of doors, nor to the employment of the presented method and means for watercooling purposes, as my invention might obviously be employed also in other places and for other purposes where a transfer of heat from a liquid to a gas (or vice versa) is desired.

I claim as my invention:—

1. A cooling tower comprising an upper spray chamber surmounting a drip chamber, means for spraying liquid into the spray chamber, and upright screens disposed below the spraying means and along which the drip of the spray descends, the drip chamber having its sides formed of louvres for admitting air and the screens being disposed in the path of the air admitted between the louvres, the louvres extending vertically and having their faces disposed for imparting rotary movement to the air admitted between them.

2. A cooling tower including a drip chamber having its sides formed of vertical louvres, screens of substantially V-shaped horizontal section disposed within the said chamber and each having the webs of its V-formation diverging outwardly of the chamber, and instrumentalities for causing liquid to trickle down the screens.

3. A cooling tower including a drip chamber having its sides formed of vertical louvres, screens of substantially V-shaped horizontal section disposed within the said chamber and each having the webs of its V-formation diverging outwardly of the chamber, and instrumentalities for causing liquid to trickle down the screens, the said instrumentalities including means for spraying liquid above the screens, means for catching such spray, and means for feeding the caught spray to the screens.

4. A cooling tower comprising a drip chamber having openings for admitting air, a laterally imperforate spray chamber surmounting the drip chamber, means for spraying liquid into the spray chamber and against the wall thereof, trough members arranged for catching the spray trickling down the said walls and for causing the caught liquid to descend in thin streams, and screens depending within the drip chamber and disposed so that the said streams of liquid will trickle down over them.

5. A cooling tower as per claim 4, in which the screens are respectively supported by the trough members.

6. A cooling tower as per claim 4, in which the screen members are respectively supported by the trough members, and means for adjusting the position of the trough members to level the latter so as to distribute the caught liquid with substantial uniformity over different portions of the screens.

7. A cooling tower comprising spraying means for projecting liquid upwardly in a substantially conical spray, an upright and elevated collar surrounding the spray means and having its upper edge close to the outer edge of the conical spray so that the spray will cause air to be drawn upwardly through the collar, a spray chamber having a wall against which the spray is projected and down which the liquid will then trickle, screens depending below the said wall, and distributing members for distributing the said trickling liquid over the screens.

8. A cooling tower comprising spraying means for projecting liquid upwardly in a substantially conical spray, a suction collar surrounding the spraying means and having its upper edge close to the outer edge of the conical spray, a spray chamber having a wall against which the spray is projected and down which the liquid will then trickle, screens depending below the said wall, relatively spaced distributing members for distributing the said trickling liquid to the screens, and bridge members connecting adjacent distributing members for intercepting liquid which would otherwise trickle down between the said members.

9. A cooling tower including a drip chamber bordered by spaced vertical louvres, perforated drip guiding means depending within the chamber and disposed in the path of air moving into the chamber through the spaces between the louvres, drip troughs supporting the drip guiding means and arranged for feeding liquid to the upper portions thereof, and means for supplying liquid to the drip troughs.

Signed at Chicago, Illinois, February 9, 1923.

BERT R. SAUSEN.